United States Patent [19]

Gray et al.

[11] Patent Number: 4,880,249
[45] Date of Patent: Nov. 14, 1989

[54] PEDAL OPERATED VEHICLE WITH CAM AND CAM FOLLOWER DRIVE ASSEMBLY

[76] Inventors: Frank Gray, 6508 River Farm Dr., St. Louis, Mo. 63129; LeRoy Stienbarger, Pressott Rd., P.O. Box 454, Licking, Mo. 65542

[21] Appl. No.: 211,762
[22] Filed: Jun. 27, 1988
[51] Int. Cl.[4] .................................. B62M 1/04
[52] U.S. Cl. ........................................ 280/253
[58] Field of Search ............... 280/244, 246, 253, 255

[56] References Cited

U.S. PATENT DOCUMENTS

| | | | |
|---|---|---|---|
| 386,990 | 7/1888 | Kibbe | 280/255 |
| 448,204 | 3/1891 | Briggs | 280/253 |
| 4,258,485 | 3/1981 | Gof | 280/253 |
| 4,762,332 | 8/1988 | Seal | 280/244 |

Primary Examiner—John A. Pekar
Attorney, Agent, or Firm—Rogers, Howell & Haferkamp

[57] ABSTRACT

A tricycle or other similar vehicle has an improved drive mechanism utilizing a pair of pedals, each of which has an associated cam and cam follower such that as the pedals are reciprocated the cam followers ride along the cams to rotate a drive axle and propel the vehicle. A shift mechanism permits realignment of the cam followers and cams to thereby change the direction of movement of the vehicle as the pedals are reciprocated. The drive mechanism and shift may be mounted to the rear wheels or, in an alternate embodiment, mounted to the front wheel of the vehicle.

10 Claims, 4 Drawing Sheets

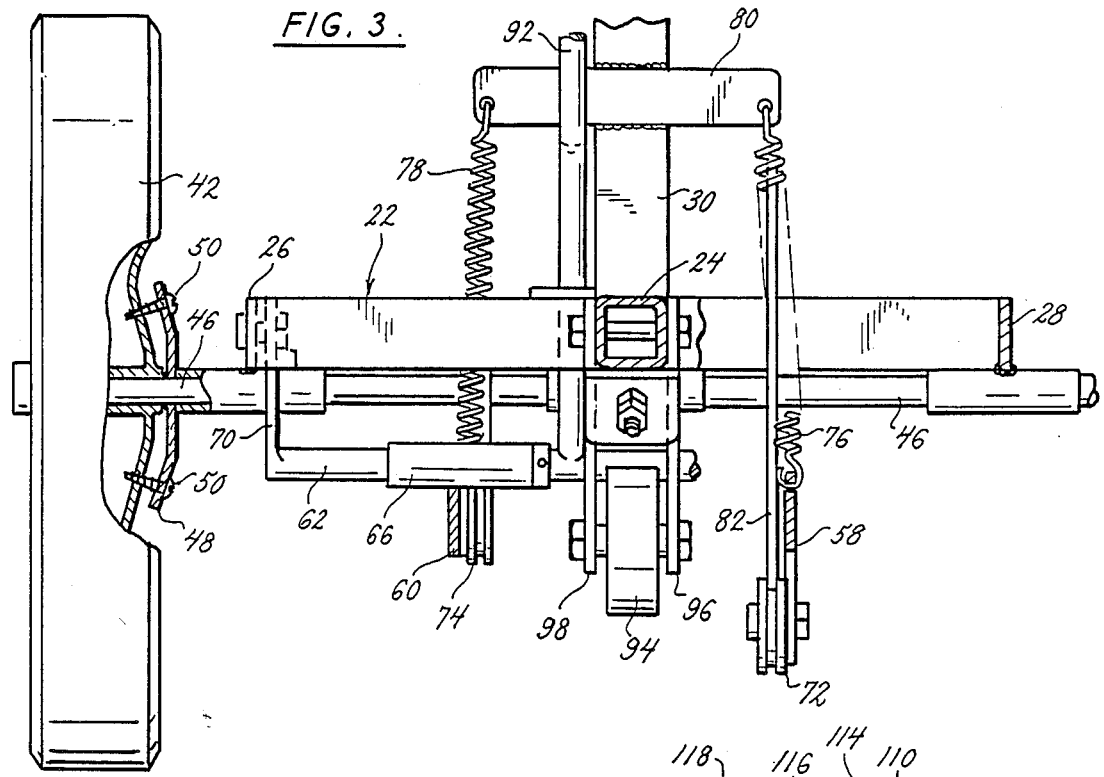
FIG. 3.
FIG. 5.
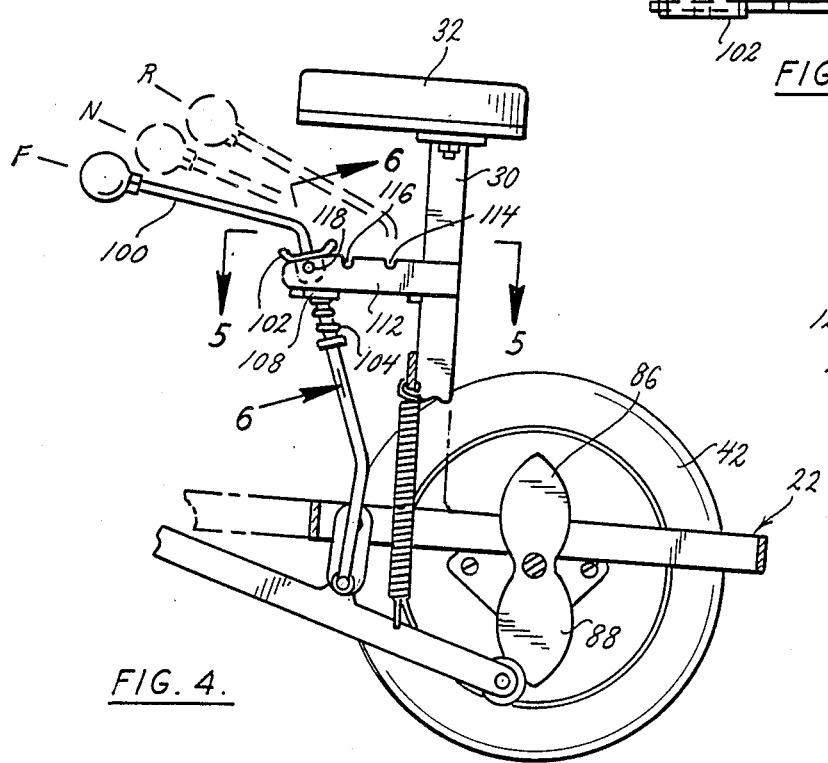
FIG. 4.
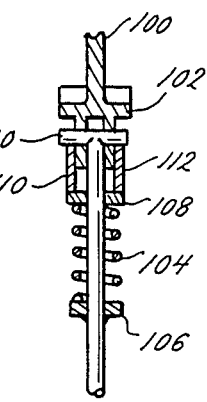
FIG. 6.

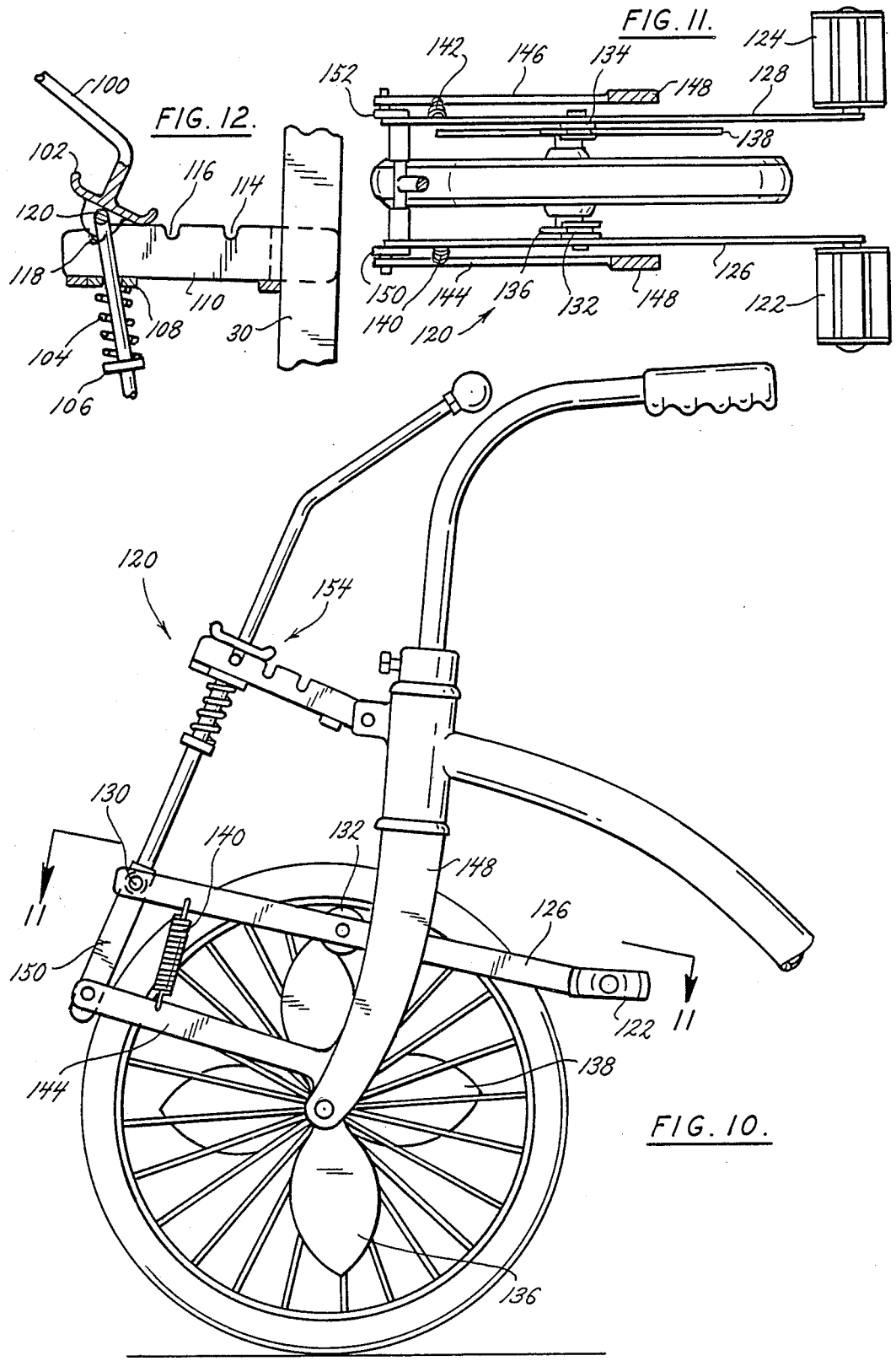

PEDAL OPERATED VEHICLE WITH CAM AND CAM FOLLOWER DRIVE ASSEMBLY

BACKGROUND AND SUMMARY OF THE INVENTION

Self-propelled vehicles are well known in the art and take many different forms. One of the more prevalent is the tricycle commonly used by children which is a three wheeled vehicle supporting a frame, the front wheel having a pair of handlebars and being steerable, and a pair of pedals for foot operation associated with a drive mechanism to propel a drive axle at the rear of the vehicle. The child usually sits on a seat positioned near the rear of the vehicle which is conveniently spaced from the pedals such that it is comfortable.

The drive mechanisms for tricycles have taken many forms in the prior art. Perhaps the simplest version is the crank where crank arms are mounted to the front wheel with pedals attached at their outer ends such that the child's legs and feet turn the cranks to thereby rotate the forward wheel and propel the vehicle. Still other more complex drive mechanisms include pedals associated with a gear or chain drive mounted at the back for driving the axle to which are mounted a pair of rear wheels. In some prior art tricycles, a mechanism is even provided for shifting of the relative position of the gears to thereby change the direction of vehicle movement as the pedals are reciprocated.

In all of these prior art vehicles, except for the simple crank handle design, the drive mechanisms are quite complex utilizing expensive gears or drive chains which also are susceptible to breakage or misalignment through the rough-house type of usage generally experienced by a child's toy. As can be appreciated, the complexity of the design can contribute to the limited availability and salability of a child's toy such that simplicity of design and operation is desirable for many reasons.

In order to solve these and other problems in the prior art, the inventors herein have succeeded in designing and developing a drive mechanism for a child's vehicle, such as a tricycle, which utilizes a simplistic but elegant cam and cam follower drive mechanism which is pedal operated and which also has a shifting mechanism for changing the vehicle's direction of movement from forward to reverse, and vice-versa. In essence, each pedal has an associated cam follower mounted thereon, with the cam follower being urged against its associated cam by a spring or the like. Each cam is mounted to a drive axle such that as the cam follower moves along the cam, it rotates the cam to thereby rotate the drive axle and drive wheel, thereby propelling the vehicle. Each cam has a unique shape which approximates an airplane propeller, or pair of flower petals, generally including a pair of lobes which are 180° offset. Additionally, the cams are themselves 90° offset. With these offsets, the pedals move alternately up and down to accommodate a reciprocal pumping action commonly used in vehicles, such as a tricycle. At the same time, with this arrangement the direction of vehicle movement can be changed by shifting the pedals and cam followers either forwardly or rearwardly to thereby change their relative position with respect to the cams such that the rollers move along the cams in the opposite direction to thereby rotate the drive axle in the opposite direction causing the vehicle to move in the opposite direction.

As can be appreciated, this drive mechanism is elegantly simple, inexpensive to manufacture, relatively insensitive to rough-house handling and treatment, includes no gears or chains which may be jammed or moved out of alignment, requires little or no lubrication or maintenance, and contributes to a versatile design providing both forward and rearward movement.

In addition to the forward and rearward directions of movement, there is a third universal position intermediate the other two positions in which the direction of rotation may be changed by merely stopping the pedaling action in a central or neutral pedal position, and then restarting in the opposite direction to thereby change the direction of rotation of the cams and the direction of movement of the vehicle. Thus, changing from forward to rearward movement requires only an intermittent hesitation of pedal movement and then a restarting of pedal movement with the opposite foot. Thus, the child has the opportunity to change direction of movement in a relatively easy and quick manner.

In an alternate embodiment, the drive mechanism may be mounted to the front wheel of the vehicle in a manner more akin to the conventional tricycle of the prior art which utilizes crank handles on the front wheel. This alternate embodiment may perhaps be even less expensive than the first embodiment to manufacture and hence may be more desirable from a cost standpoint. Furthermore, its compact design may be more suitable for smaller sizes while the first embodiment may be more suitable for larger sizes of vehicles.

While the principal advantages and features of the invention have been discussed above, a greater understanding of the invention and appreciation for its features may be attained by referring to the drawings and description of the preferred embodiment which follow.

BRIEF DESCRIPTION OF THE DRAWINGS

FIG. 3 is a partial cross-sectional view taken along the plane of line 3—3 in FIG. 1 and detailing the mounting of the pedal and cam followers to the frame;

FIG. 4 is a partial side view of the drive mechanism showing the movement of the shift lever to change the direction of vehicle movement;

FIG. 5 is a partial cross-sectional view taken along the plane of line 5—5 in FIG. 4 detailing the shift mechanism;

FIG. 6 is a partial cross-sectional view taken along the plane of line 6—6 in FIG. 4 further detailing the shift mechanism;

FIG. 10 is a side view of an alternative embodiment of the present invention showing the drive mechanism mounted to the front wheel;

FIG. 11 is a top view of the second embodiment detailing the mounting of the drive mechanism; and FIG. 12 is a partial side view detailing the shift lever of the second embodiment.

DETAILED DESCRIPTION OF THE PREFERRED EMBODIMENT

Figure 1:
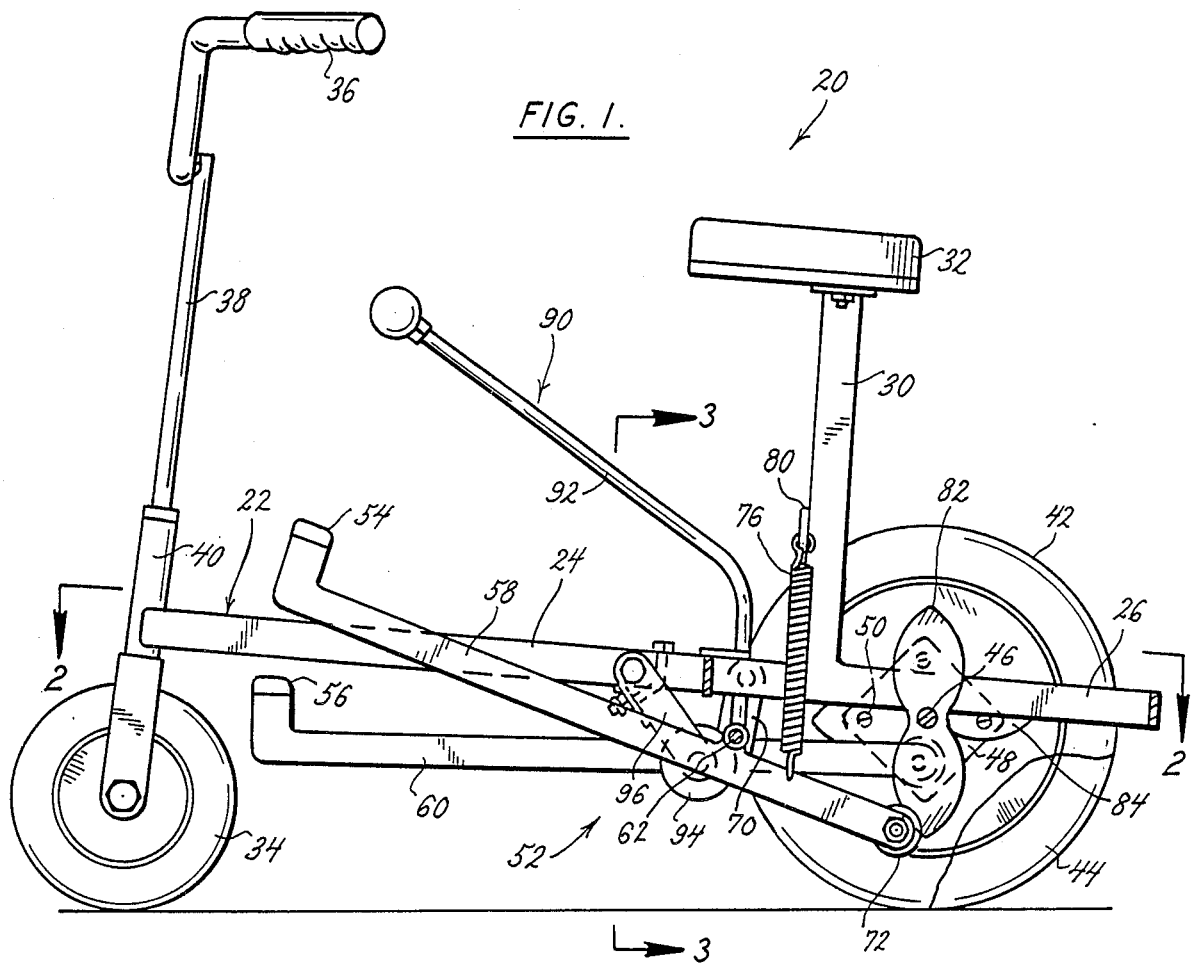
FIG. 1 is a side view of a toy vehicle with the improved drive mechanism of the present invention.

The first embodiment 20 of the toy vehicle with improved drive mechanism of the present invention is shown in FIGS. 1-9 and generally includes a frame 22 having a center rail 24 with a pair of rectangular side members 26, 28 at the rear of the frame. An upstanding post member 30 supports a seat 32 atop which a rider may rest while on the vehicle. A front wheel 34 is steerable by a pair of handlebars 36 secured atop an upstanding steering post and yoke member 38 which is pivotally secured to frame 22 through a collar member 40. At the rear of the vehicle 20 are a pair of support wheels 42, 44 which are mounted to a drive axle 46. One of the wheels 42 is fixedly secured to drive axle 46 by an attachment plate 48 while the other wheel 44 is free to rotate about the drive axle 46. Attachment plate 48 is best shown in FIG. 3 as welded to drive axle 46 and secured to wheel 42 by four screws 50.

Figure 2:
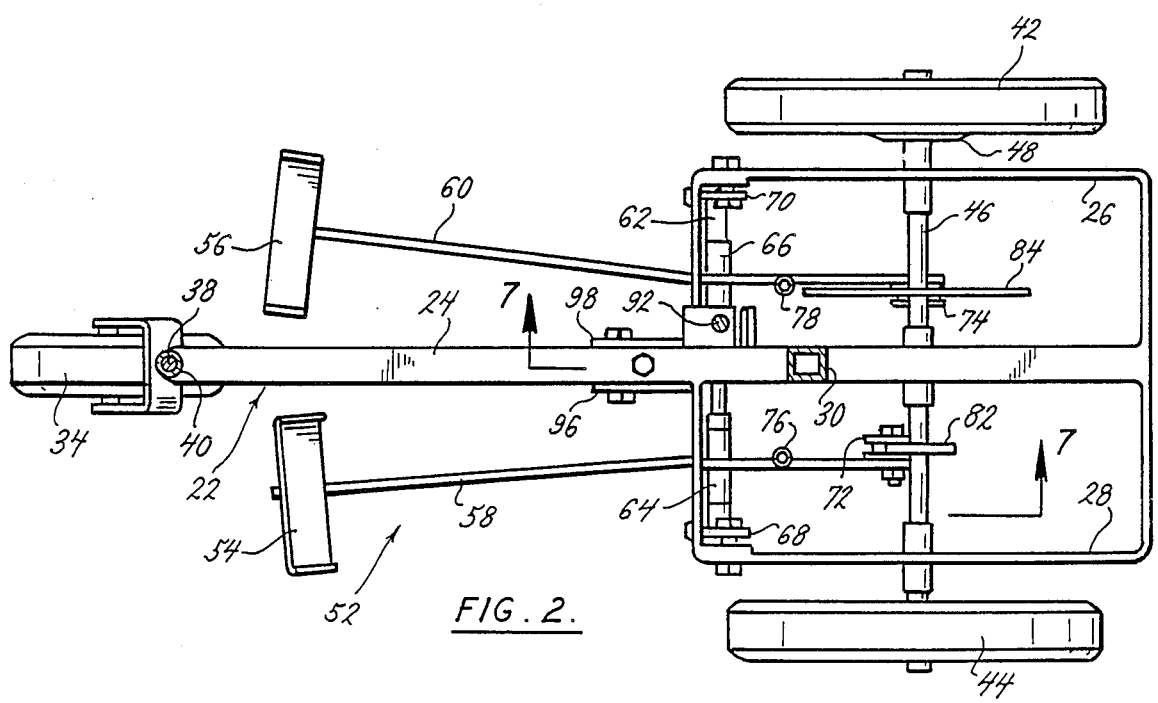
FIG. 2 is a top view of the toy vehicle further detailing the drive mechanism.

The pedal and drive mechanism 52 generally includes a pair of pedals 54, 56, each of which are mounted at one end of a connecting rod 58, 60. Connecting rods 58, 60 are pivotally secured to a support axle 62 by collar members 64, 66. Support axle 62 is pivotally connected through support links 68, 70 to the rectangular frame members 26, 28. Therefore, support axle 62 and thus connecting rods 58, 60 may be shifted in a fore and aft direction about the frame 22. The importance of this shall become more apparent as its operation is explained more completely below. At the other end of each connecting rod 58, 60 is pivotally mounted a cam follower 72, 74 with a spring 76, 78 extending between a spring bracket 80 and each connecting rod 58, 60. Springs 76, 78 urge cam followers 72, 74 against their respective cams 82, 84. As best shown in FIG. 4, cams 82, 84 each are generally shaped in the form of an airplane propeller, with lobes 86 and 88 which are generally arcuate shaped and which are offset by 180°. As shown in FIG. 2, the cams 82, 84 are oriented such that their lobes are offset by 90°. For example, as shown in FIG. 2, the lobes of cam 82 are oriented such that they extend into and out of the drawing figure while the lobes of cam 44 extend to the left and the right in the drawing figure. This orientation helps maintain the offset of pedals 54, 56 such that one is up while the other is down in conventional fashion for a vehicle.

Figure 7:
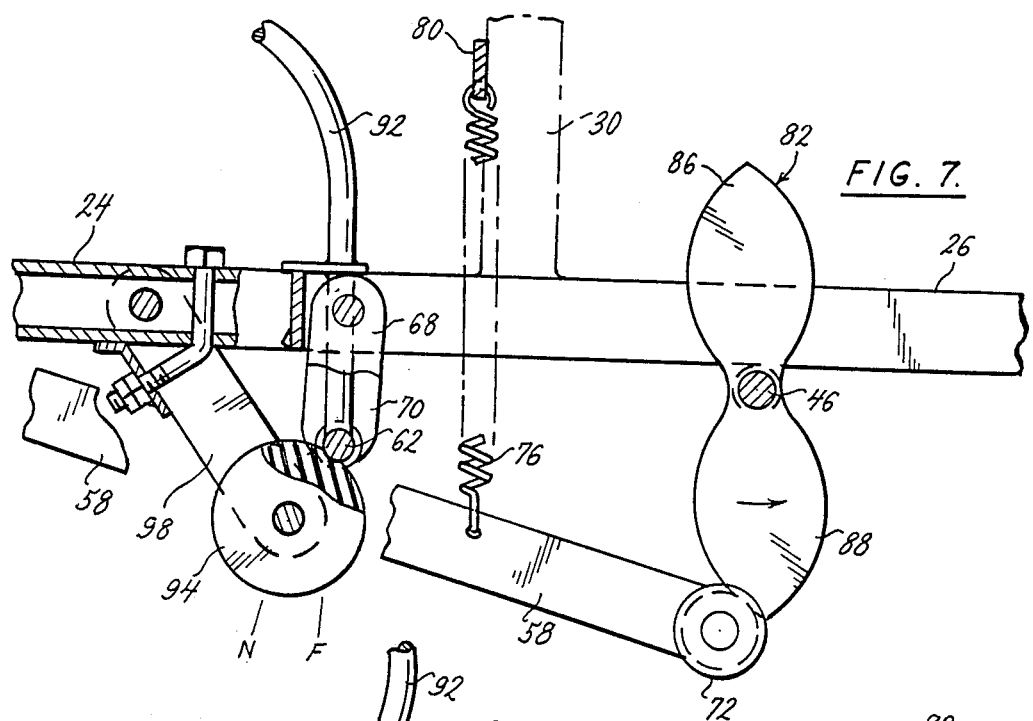
FIG. 7 is a partial cross-sectional view taken along the plane of line 7—7 in FIG. 2 and detailing the relative position of a cam and cam follower as the shift mechanism is in the forward direction.
Figure 8:
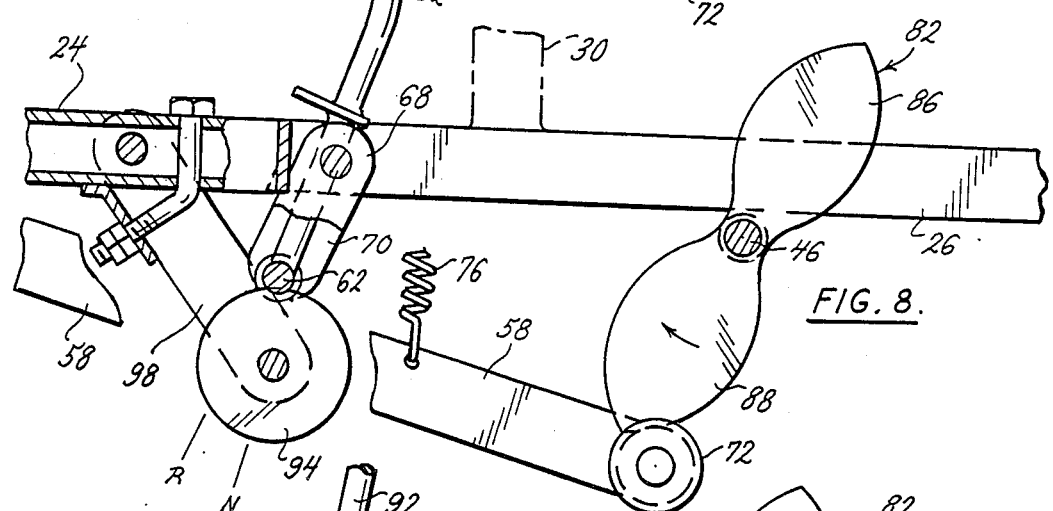
FIG. 8 is a partial cross-sectional view showing the relative position between the cam follower and cam when the shift mechanism is in the reverse position.
Figure 9:
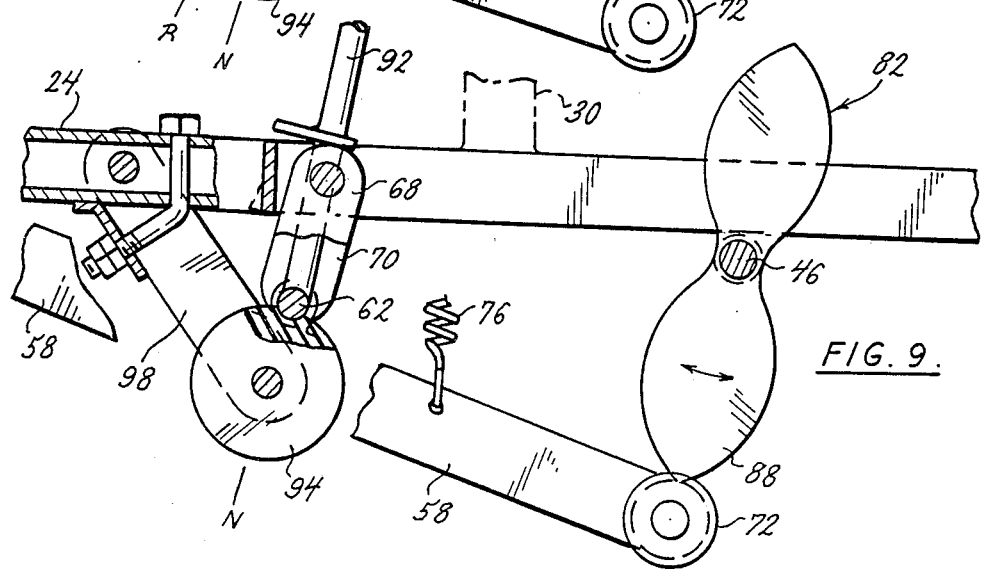
FIG. 9 is a partial cross-sectional view showing the relative position between the cam and cam follower when the shift mechanism is in the universal or neutral position.

A first embodiment of a shift mechanism 90 is shown in FIGS. 1-3 and includes a shift lever 92 welded to support axle 62, support axle 62 being in contact with roller 94. Roller 94 is supported by a pair of mounting brackets 96, 98 from center frame member 24. This is best shown in FIG. 3. With this arrangement, in order to shift from forward to reverse, shift lever 92 is moved to thereby swing support axle 62 about roller 94 and move it from an over-center position on one side thereof to an over-center position on the other side thereof. With this shifting arrangement, the support axle 62 along with the connecting rods 58, 60 are shifted in a fore and aft direction about the frame 22 so as to change the relative position between cams 82, 84 and cam followers 72, 74 and thereby change the direction of vehicle movement as the pedals 54, 56 are reciprocated by a rider. This is best understood by viewing FIGS. 7-9. For purposes of explaining shifting, the cams and cam followers are assumed to be oriented as shown in FIG. 2, with cam follower 74 in the crotch of cam 84, or adjacent the drive axle 46, and cam follower 72 is proximate the tip of cam 82. As is apparent from viewing the drawings, the length of each pedal stroke is determined by the movement of each cam follower from the tip to the crotch of its associated cam. Therefore, with cam follower 74 in the crotch of cam 84, cam follower 72 is oriented as shown in FIGS. 7-9, with each pedal at the furthest extent of its stroke. Thus, as shown in FIG. 7, with the shift lever 92 oriented towards the rear of roller 94, cam follower 72 is aligned forwardly of lobe 88 such that as cam follower 72 is moved along the forward edge of lobe 88, drive axle 46 is rotated in a direction to drive the vehicle forwardly. As shown in FIG. 8, shift lever 92 may be moved to an over-center position on roller 94 to re-position cam follower 72 with respect to cam 82 such that as cam 72 is moved along lobe 88, drive axle 46 is rotated in a direction to move the vehicle rearwardly. As shown in FIG. 9, a center universal or neutral position may also be achieved by moving shift lever 92 into a center position on roller 94 such that cam follower 72 is balanced at the tip of lobe 88. In this position, the momentum of the vehicle keeps the drive axle and, hence, the cam turning in the same direction to maintain the same direction for vehicle movement as the pedals are reciprocated. To change direction, the rider need merely stop the vehicle and push start it in the opposite direction to gain reverse momentum. This universal or neutral position is achievable with the shift mechanism 90 as shown in FIGS. 7∝9. However, an alternate shift mechanism is shown in FIGS. 4-6 which provides a positive locking position for this universal or neutral position which provides more reliable operation.

As shown in FIGS. 4-6, a shift lever 100 has an upper slide plate 102 which is held in position by a spring 104 compressed between spring stop 106 and guide plate 108. A pair of brackets 110, 112 are welded to post 30 and have three notches 114, 116, 118 which define the three choices for movement of the vehicle. As is apparent from viewing the drawings, and especially FIG. 4, an operator may move the shift lever 100 from slot 118 for forward position by lifting or rocking the shift lever against brackets 110, 112 which compresses spring 104 and permits the lifting of pin 120 out of slot 118 so that the shift lever 100 may be moved backwards to the neutral position by dropping pin 120 into slot 116. A similar action permits further shifting of the mechanism from the neutral position with pin 120 in slot 116 into the reverse position where pin 120 resides in slot 114.

An alternate embodiment 120 of the improved drive mechanism of the present invention is shown in FIGS. 10-12. As shown therein, a pair of pedals 122, 124 are mounted at the rearward ends of connecting rods 126, 128 which are themselves pivotally secured at their forward ends to a support axle 130. Cam followers 132, 134 are mounted to connecting rods 126, 128, respectively and are aligned with cams 136, 138. Springs 140, 142 extend between connecting rods 126, 128 and support brackets 144, 146 which are attached to the front fork 148. Connecting brackets 150, 152 interconnect support brackets 144, 146 with connecting brackets 126, 128. A shift lever and mechanism 154 similar to that shown in FIGS. 4-6 is utilized to provide shifting capability, as described above. In this alternate embodiment, a pedal and drive mechanism is shown mounted to the forward wheel of the tricycle, along with a shift mechanism which provides all of the capabilities of the first embodiment but in a much more compact design.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a self-propelled vehicle, the vehicle having a frame, a seat secured to the frame for supporting a rider, and a plurality of wheels supporting the frame, the improvement comprising a drive mechanism including a pair of pedals, said pedals having at least one associated cam and cam follower, a drive axle, at least one of said wheels being mounted to the drive axle, at least one cam or cam follower being mounted to the drive axle, the other of said one cam or cam follower being connected to the pedals, and means to urge the cams and cam followers together and said pedals having means to propel the vehicle by creating relative movement between the cams and cam followers.

2. The device of claim 1 wherein each cam has two lobes, said lobes being substantially 180° offset from each other.

3. The device of claim 2 wherein each pedal has an associated cam and cam follower, and wherein the lobes of one cam are offset 90° from the lobes of the other cam.

4. The device of claim 3 wherein the cams are secured to the drive axle and the cam followers are connected to their associated pedals.

5. The device of claim 4 further comprising means to adjust the relative position between the cams and cam followers to thereby change the direction of vehicle movement from forward to reverse, or vice-versa.

6. The device of claim 5 wherein said pedals and their associated cam followers are pivotally mounted to the frame, and said position adjustment means comprises means to shift the pedals and cam followers in a fore and aft direction with respect to the frame.

7. In a self-propelled vehicle, the vehicle having a frame, a seat secured to the frame for supporting a rider, and a plurality of wheels supporting the frame, the improvement comprising a drive mechanism including a pair of pedals, each of said pedals having an associated cam follower connected thereto, a drive axle, a pair of cams, at least one of said wheels and said cams being mounted to the drive axle, means to urge the cams and cam followers together, and said pedals having means to propel the vehicle by creating relative movement between the cams and cam followers.

8. The device of claim 7 wherein each of said cams has two lobes, said lobes being substantially 180° offset from each other, and wherein the lobes of one cam are offset 90° from the lobes of the other cam.

9. The device of claim 8 further comprising means to shift the relative position between the cams and cam followers to thereby change the direction of vehicle movement from forward to reverse, or vice-versa.

10. The device of claim 9 wherein said position adjustment means comprises means to shift the pedals and their associated cam followers in a fore and aft direction with respect to the frame.

* * * * *